United States Patent
Xu et al.

(10) Patent No.: US 12,380,630 B2
(45) Date of Patent: Aug. 5, 2025

(54) GEOMETRY-GUIDED CONTROLLABLE 3D HEAD SYNTHESIS

(71) Applicant: Lemon Inc., Grand Cayman (KY)

(72) Inventors: Hongyi Xu, Los Angeles, CA (US); Guoxian Song, Los Angeles, CA (US); Zihang Jiang, Singapore (SG); Jianfeng Zhang, Singapore (SG); Yichun Shi, Los Angeles, CA (US); Jing Liu, Los Angeles, CA (US); Wanchun Ma, Los Angeles, CA (US); Jiashi Feng, Singapore (SG); Linjie Luo, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 135 days.

(21) Appl. No.: 18/165,794

(22) Filed: Feb. 7, 2023

(65) Prior Publication Data

US 2024/0265621 A1    Aug. 8, 2024

(51) Int. Cl.
*G06T 15/08*  (2011.01)
*G06T 3/4046*  (2024.01)
*G06T 3/4053*  (2024.01)
*G06V 40/16*  (2022.01)

(52) U.S. Cl.
CPC ............ *G06T 15/08* (2013.01); *G06T 3/4046* (2013.01); *G06T 3/4053* (2013.01); *G06V 40/176* (2022.01)

(58) Field of Classification Search
CPC ..... G06T 15/08; G06T 3/4046; G06T 3/4053; G06T 17/00; G06V 40/176
See application file for complete search history.

(56) References Cited

PUBLICATIONS

Sanyal et al., Learning to Regress 3D Face Shape and Expression From an Image Without 3D Supervision, Proceedings of the IEEE/CVF Conference on Computer Vision and Pattern Recognition (CVPR), 2019, pp. 7763-7772 (Year: 2019).*

Yariv et al., Volume Rendering of Neural Implicit Surfaces, 35th Conference on Neural Information Processing Systems (NeurIPS 2021 (Year: 2021).*

Chan et al., Efficient Geometry-aware 3D Generative Adversarial Networks, arXiv, 2112.07945v2 [cs.CV], Apr. 27, 2022 (Year: 2022).*

Tang et al.,3DFaceShop: Explicitly Controllable 3D-Aware Portrait Generation, arXiv: 2209.05434v3 [cs.CV], Oct. 17, 2022 (Year: 2022).*

Park et al, DeepSDF: Learning Continuous Signed Distance Functions for Shape Representation, Proceedings of the IEEE/CVF Conference on Computer Vision and Pattern Recognition (CVPR), 2019, pp. 165-174 (Year: 2019).*

(Continued)

*Primary Examiner* — Kee M Tung
*Assistant Examiner* — Biao Chen
(74) *Attorney, Agent, or Firm* — Fish & Richardson P.C.

(57) ABSTRACT

Technologies are described and recited herein for producing controllable synthesized images include a geometry guided 3D GAN framework for high-quality 3D head synthesis with full control on camera poses, facial expressions, head shape, articulated neck and jaw poses; and a semantic SDF (signed distance function) formulation that defines volumetric correspondence from observation space to canonical space, allowing full disentanglement of control parameters in 3D GAN training.

14 Claims, 4 Drawing Sheets

(56) References Cited

PUBLICATIONS

Li et al., Learning a model of facial shape and expression from 4D scans, ACM Transactions on Graphics, vol. 36, No. 6, Article 194. Publication date: Nov. 2017 (Year: 2017).*

Thiemo Alldieck et al. imGUHM: Implicit generative models of 3d human shape and articulated pose. In ICCV, pp. 5461-5470, 2021.

Eric R Chan et al. Efficient geometry-aware 3d generative adversarial networks. pp 16124-16133. CVPR, 2022.

Yu Deng et al.. Disentangled and controllable face image generation via 3d imitative-contrastive learning. In cvpr, pp. 5154-5163, 2020.

Amos Gropp et al. Implicit geometric regularization for learning shapes. In ICML, pp. 3569-3579. 2020.

Yang Hong et al. Headnerf: A real-time nerf-based parametric head model. In cvpr, pp. 20374-20384, 2022.

Tianye Li et al. Learning a model of facial shape and expression from 4D scans. ACM Transactions on Graphics, 36 (6):194:1-194:17, 2017.

Roy Or-El et al.. StyleSDF: High-resolution 3d-consistent image and geometry generation. CVPR, 2022. (18 pages).

Alon Shoshan et al. GAN-control: Explicitly controllable GANs. In Proceedings of the IEEE/CVF International Conference on Computer Vision, pp. 14083-14093, 2021.

Junshu Tang et al.. Explicitly controllable 3d-aware portrait generation. arXiv preprint arXiv:2209.05434, 2022. (20 pages).

Yue Wu et al.. AniFacegGAN: Animatable 3d-aware face image generation for video avatars. arXiv preprint arXiv:2210.06465, 2022. (14 pages).

Lior Yariv et al. Volume rendering of neural implicit surfaces. In NeurIPS, 2021. (19 pages).

\* cited by examiner

GEOMETRY-GUIDED CONTROLLABLE 3D HEAD SYNTHESIS

TECHNICAL FIELD

The embodiments described herein pertain generally to facial-image synthesis, editing, and animation.

BACKGROUND

In the field of photo-realistic image synthesis, editing, and animation, technologies are improving rapidly with regard to semantic and style editing for facial images. However, current methodologies include manipulating and animating expressions and poses of facial images while operating on two-dimensional (2D) convolutional networks (CNNs) without explicitly enforcing the underlying 3D facial structure, thus failing to maintain 3D consistency when synthesizing faces as facial expressions and postures change.

SUMMARY

In one example embodiment disclosed and recited herein, a method for generating controllable three-dimensional (3D) synthesized images includes conditioning 3D representations of a head geometry in a canonical space based on feature vectors and camera viewing parameters by: mapping control parameters for the head geometry, corresponding to an input, and a signed distance function (SDF) onto the head geometry to produce 3D point-to-point volumetric correspondences of points in the observation space to the head geometry in the canonical space; combining the 3D representations of the head geometry and the 3D point-to-point volumetric correspondences of points in the observation space to the head geometry in the canonical space to produce a 3D object; and synthesizing the 3D object to combine feature layers of the 3D object.

In accordance with another example embodiment disclosed and recited herein, an image synthesis framework that produces controllable 3D synthesized images includes: a 3D model generator to generate 3D representations of a head geometry in a canonical space based on feature vectors and camera viewing parameters; an MLP to map control parameters for the head geometry, corresponding to an input, and a signed distance function (SDF) onto the head geometry to produce 3D point-to-point volumetric correspondences of points in the observation space to the head geometry in the canonical space; synthesizers to combine the 3D representations of the head geometry and the 3D point-to-point volumetric correspondences of points in the observation space to the head geometry in the canonical space to produce a 3D object and to synthesize the 3D object to combine feature layers of the 3D object; a renderer to volume render the synthesized 3D object based on the 3D point-to-point volumetric correspondences to produce a volume-rendered feature map; a super resolution module to synthesize the volume-rendered feature map to produce a high-resolution image; and an encoder to encode the high-resolution image to produce a controllable 3D model having the control parameters corresponding to the input.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the features of the present disclosure, as generally described and recited herein, as well as illustrated in the drawings, may be arranged, substituted, combined, separated, and designed in a wide variety of different configurations, all of which are explicitly contemplated herein.

Additionally, portions of the present disclosure may be described herein in terms of functional block components and various processing functions, steps, or operations. It should be appreciated that such functional blocks may be realized by any number of hardware and/or software components configured to perform the specified functions.

In the present description and recitation, the following terms may be used, in addition to their accepted meaning, as follows.

Machine learning may refer to a learned or trained computer or processor-related technology by which decisions and/or actions are autonomously made, in place of human intervention. Machine learning refers to software, i.e., algorithms and/or programs, hardware or firmware, or any combination thereof that supports natural language understanding and/or processing, speech recognition, computer vision, etc. Also included among the range of machine learning functions and capabilities, and pertinent to the embodiments disclosed, recited, and suggested herein, are model training and image generation.

An engine or generator, as referenced herein, may refer to a type of software, firmware, hardware, or any combination thereof, that facilitates generation of source code or markup to produce elements that begin another process. In addition, or alternatively, an engine or generator may facilitate automated processes, in which various software elements interact to produce an intended product, whether physical or virtual based on natural language descriptions, inputs, or other prompts. In accordance with known machine learning technologies, the machine learning engines or generators disclosed, recited, and/or suggested herein are trained in accordance with either unimodal or multimodal training models.

Latent code, e.g., latent code z, etc., in a latent space may refer to a vector containing random values sampled from a Gaussian (normal) distribution and/or Gaussian noise. Accordingly, latent space may refer to a simpler, i.e., lower-dimensional, etc., hidden representation of a data point.

A camera pose may refer to a position and orientation of a camera in a coordinate system, with respect to six degrees of freedom, using different representations, e.g., a transformation matrix. The six degrees of freedom may be grouped into two categories: translations and rotations. Translations include linear, horizontal straightness, and vertical straightness; rotations include pitch, yaw, and roll. A camera pose may include the estimation of objects' poses in scenes or scenarios for the camera. In an example embodiment, camera poses may be estimated from training images from an image dataset, e.g., using a camera pose estimator.

Multilayer perceptron or MLP may refer to a feedforward artificial neural network that is to generate a set of outputs from a set of inputs. As described, recited, or otherwise referenced herein, an MLP may be characterized by several layers of input nodes connected as a directed graph between the input and output layers. Such layers are known in the art.

A model or framework may refer to software, e.g., algorithms and/or programs, hardware or firmware, or any combination thereof, that supports machine learning, natural language understanding, natural language processing, speech recognition, computer vision, etc.

A tri-plane representation may refer to a feature representation that combines an explicit backbone that produces features aligned on three orthogonal planes.

A discriminator, as described, recited, or otherwise referenced herein, may refer to a classifier to distinguish real data from data created by a generator, i.e., a discriminator may determine whether input samples are real or fake since input samples may be real samples coming from training data or fake coming from the generator.

A mapping network may refer to a function or algorithm that may embed input latent code to intermediate latent space that may be used as a style and may be incorporated at each block of synthesis network.

A generative adversarial network, i.e., GAN, may refer to an algorithmic architecture that uses two neural networks, pitting one against the other (thus "adversarial") in order to generate new, synthetic instances of data that can pass for real data. A GAN may typically be used in image generation, video generation, voice generation, or the like. Further, a GAN may include a generator, which learns to generate plausible data, and a discriminator. The generated instances may become negative training examples for a discriminator, which learns to distinguish the generator's fake data from real data.

Rendering or neural rendering may refer to a class of deep image and video generation approaches that enable explicit or implicit control of scene properties such as illumination or lighting, camera parameters, poses, geometry, appearance, shapes, semantic structure, etc. As described, recited, or otherwise referenced herein, rendering or neural rendering may refer to an operation or function, based on deep neural networks and physics engines, for creating novel images and video footage based on existing scenes. In accordance with the non-limiting embodiments described and recited herein, functions of rendering or neural rendering may be implemented by a renderer or neural renderer.

Super-resolution imaging may refer to a class of techniques to enhance and/or increase resolution of an imaging system. Image super resolution may refer to enhancing a resolution of an image from low-to-high resolution or recovering one or more high-resolution images from low-resolution images. In accordance with the non-limiting embodiments described and recited herein, functions of super resolution may be implemented by a super resolution module. Further, an output image of a super resolution module may refer to one or more super-resolved images.

Image datasets may refer to a collection of images curated for machine learning, i.e., for training, testing, evaluation, etc.

Conditioning or model conditioning may refer to adding or supplementing an existing design model and/or framework to render the existing model and/or framework more useful, robust, efficient, for forward-looking utilization.

A social media application, as referenced herein, may refer to an on-line application that allows account-holding users to interact with one another using various media on varying scales, with such interaction including creating and/or sharing media content. As described and recited herein, a user device may have an instance of social media application account stored locally or may access the user's account via a web-based version of the particular social media application.

A gaming application, as referenced herein, may refer to an on-line application that facilitates interaction with a user interface or input device to generate visual feedback for a competitive and/or cooperative online endeavor. A gaming application may be implemented via an online platform that facilitates interaction between remote users, each of which participates using a separate smartphone; computer, e.g., tablet, server-based, etc.; virtual and/or augmented reality system; and/or cloud-based processing device.

A platform, e.g., a social media platform and/or gaming platform, as referenced herein, may refer to an application on which algorithms and/or programs enabling execution or implementation of a collection of communication-based or media-sharing technologies may be hosted. Further, any algorithm or program described, recited, or suggested herein may be executed by one or more processors hosted on such a platform. Non-limiting examples of such technologies may include the creation, sharing, and/or storage of multi-media offerings.

Media, or multi-media, offerings or experiences, as referenced herein, may include but not be limited to recorded or live transmittable content including text, audio, images, animations, video, games, etc. In addition, such offerings or experiences may include, but again not be limited to, interactive augmented reality (AR) and/or interactive virtual reality (VR) experiences.

Figure 1:
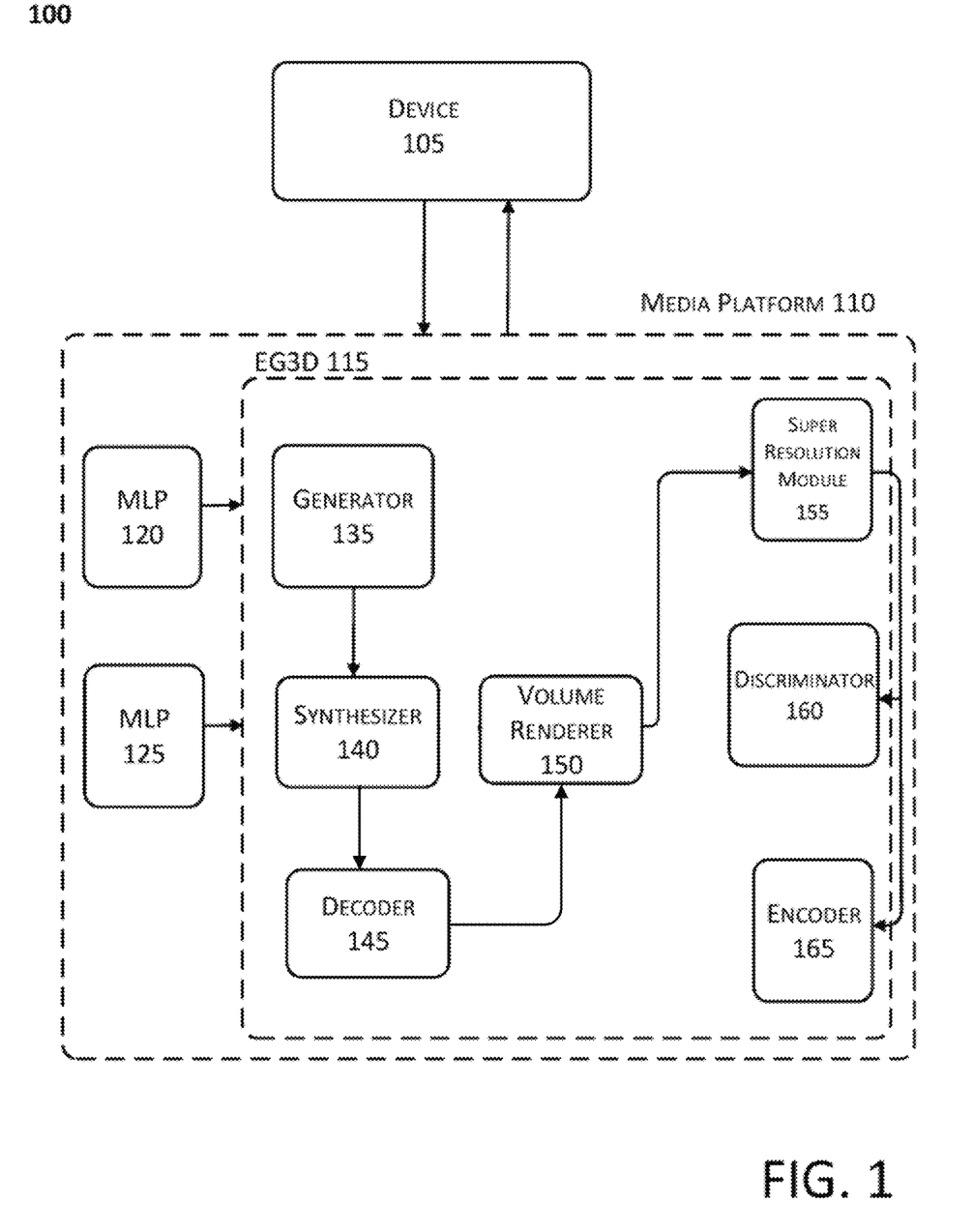
FIG. 1 shows a schematic overview of an implementation of geometry-guided 3D head synthesis, arranged in accordance with at least some embodiments described and recited herein.

FIG. 1 shows a schematic model 100 of an implementation of geometry-guided 3D head synthesis, arranged in accordance with at least some embodiments described and recited herein.

As depicted in FIG. 1, model 100 includes device 105 and media platform 110. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or any combination thereof.

Device 105 may refer to one or more embodiments of a classical computing device that may be, or include, a classical computer, processing device, a microprocessor, a microcontroller, a digital signal processor, or any combination thereof. Device 105 may be one of various electronic devices, or a combination thereof, having one or more image and/or video capturing components, i.e., camera and/or video recorder, display screens with audio and/or video inputs/outputs and that support the providing of and consumption of content relative to a media platform. The various electronic devices may include but not be limited to a smartphone, a tablet computer, a laptop computer, a desktop computer, a gaming console, and/or any other suitable electronic devices.

Non-limiting examples of device 105 as a specialized gaming console may include, but not be limited to, a Microsoft® XBox®, Sony® Playstation®, a Nintendo Switch®, Apple® TV®, Sega® Genesis®, etc. Non-limiting examples of device 105 as an augmented reality (AR) and/or virtual reality (VR) console may include, but not be limited to, Oculus Rift®, HTC® Vive®, Playstation® VR, Microsoft® Hololens®, etc. Additional non-limiting examples of device 105 may include a database, local server, cloud-based service, etc. Further, any algorithm or program described, recited, or suggested herein may be executed by one or more processors hosted on device 105.

Media platform 110 may include, at least, MLP 120, MLP 125, and EG3D framework 115. EG3D framework 115 may include, at least, generator 135, synthesizer 140, decoder 145, volume renderer 150, super-resolution module 155, discriminator 160, and encoder 165.

Media platform 110, may refer to, e.g., a social media platform or a gaming platform, as non-limiting examples, on which is implemented an application to provide users with a selection among one or more controllable 3D synthesized images, e.g., avatars.

Each function and/or operation of the various components of media platform 110 may be implemented, individually and/or collectively, by a wide range of hardware, software, firmware, or any combination thereof; and may be divided into additional components, combined into fewer components, or eliminated altogether while being contemplated within the scope of the disclosed subject matter. Thus, the components of media platform 110, as described and recited herein, may be regarded as a computing and/or processing system.

In accordance with the non-limiting example embodiment of FIG. 1, the model and framework shown may implement a geometry-guided 3D head synthesis model that is trained from unstructured images. The model is to synthesize a wide range of 3D-human headshots with full control over camera poses, facial expressions, head shapes, articulated neck and jaw poses. Accordingly, the model utilizes an explicitly defined novel semantic signed distance function (SDF) around a head geometry, e.g., faces learned with an articulated model and expressions (FLAME) model, which is conditioned on control parameters therefore.

MLP 120 may refer to a multilayer perceptron (MLP) that may be programmed, designed, or otherwise configured to receive input from device 105 that includes, e.g., an image or video, and at least corresponding latent code z and camera poses c to produce a 3D neural feature field for volume rendering and super-resolution. Further, MLP 120 is disentangled of underlying geometric variations of changing shape and expression.

MLP 125 may refer to an MLP that may be trained on the control parameters from a parameterized head geometry, e.g., FLAME model, to thereby produce a corresponding semantic SDF. Accordingly, MLP 125 may be programmed, designed, or otherwise configured to receive input from device 105 that includes, e.g., an image or video, and at least corresponding control parameters including shape $\alpha$, expression $\beta$, and jaw and/or neck poses $\theta$ to facilitate the generation or building of a differentiable volumetric correspondence map from the observation space to a disentangled canonical space utilizing the FLAME model control parameters.

EG3D framework 115 may refer to a 3D GAN (Generative Adversarial Network) framework that may be leveraged to synthesize realistic shape and appearance of 3D human heads in a canonical space, including the modeling of hair, apparel, wrinkles and varying shading as subjects change expressions and poses. Thus, the identity of synthesized subjects may be preserved with compelling dynamic details while changing expressions and poses, outperforming prior methods both quantitatively and qualitatively.

Generator 135 may refer to an image generator, as part of EG3D framework 115, which be programmed, designed, or otherwise configured to generate tri-plane neural volume representations of a human head, with features aligned on three orthogonal planes, and map the control parameters onto 3D point-to-point volumetric correspondences from observation space to canonical space. In accordance with at least some of the non-limiting example embodiments described and recited herein, generator 135 takes the random latent code z, i.e., Gaussian noise, and conditioning camera poses c from MLP 120, and maps to a manifold of triplane features. A low-resolution feature map may then rendered from a desired camera pose c by sampling the triplane features and integrating decoded neural radiance ($\sigma$, f) with a tiny MLP along camera rays.

Synthesizer 140 may be programmed, designed, or otherwise configured to synthesize the output of MLP 120 and MLP 125. The output of MLP 120 is characterized with triplanes, operates in a canonical space, and generates a high-fidelity appearance and geometry of a synthesized identity, including hair, wrinkles, and apparel, fully independent from all controls pertaining to appearance, including shape, expression, and neck/jaw movement. The output of MLP 125 is an animatable 3D head that models the deformed head geometry, parameterized by the semantic shape and expression code.

Decoder 145 may refer to another MLP that may be programmed, designed, or otherwise configured to receive and decode canonical triplane features from synthesizer 140 to render a feature map of the synthesized image.

Volume renderer 150 may be programmed, designed, or otherwise configured to receive the feature map from decoder 145 and then map the decoded neural radiance field from the canonical space to the observation space, i.e., guided by the volumetric correspondence, mapping to output the geometry and image in the observation space.

To ensure the consistency of synthesized 3D head shape with the controlling head geometry, a geometry prior loss may be utilized to minimize the difference between the synthesized neural density field and the head SDF in observation space. Further, to improve the control accuracy, an image encoder may be pre-trained in accordance with the control parameters in order to formulate a control loss to ensure that the synthesized images match the input control code upon encoding.

Super-resolution module 155 may be programmed, designed, or otherwise configured to modulate the volume-rendered feature map and synthesize the final images at a high resolution.

Discriminator 160 may be programmed, designed, or otherwise configured to receive the high-resolution image modulated by super-resolution module 155 and distinguish generated fake data from real data.

Encoder 165 may be programmed, designed, or otherwise configured to estimate expression parameters for the jaw and neck of the synthesized image modulated by super-resolution module 155. Further, encoder 165 may compare the estimated expression parameters to those input to MLP 125 to determine loss, in an operation to improve control accuracy of the output synthesized images.

Figure 2:
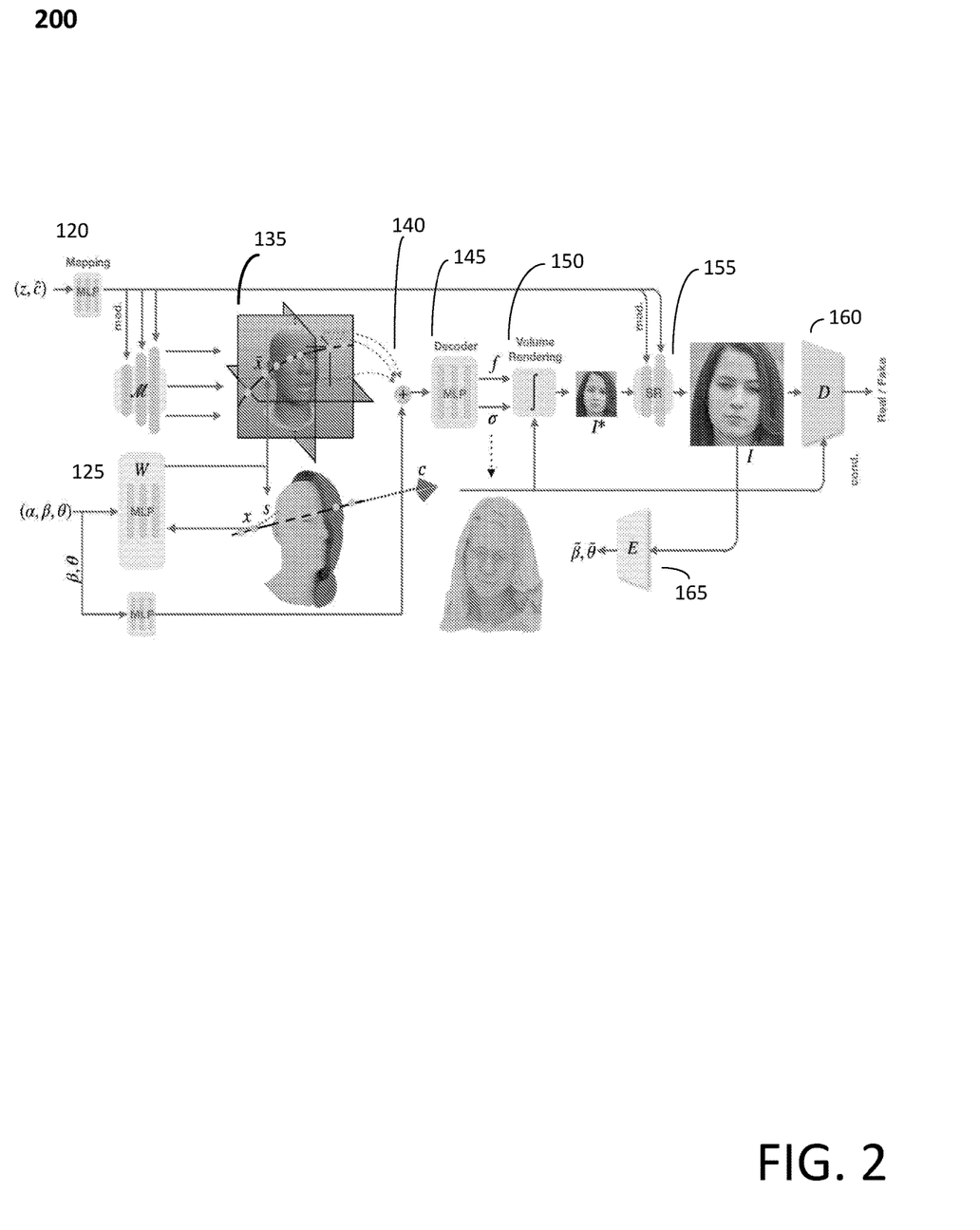
FIG. 2 shows a system by which geometry-guided 3D head synthesis may be implemented or executed, arranged in accordance with at least some embodiments described and recited herein.

FIG. 2 is a schematic view of model 100 by which geometry-guided 3D head synthesis may be implemented, arranged in accordance with at least some embodiments described and recited herein, further to model 100 shown in FIG. 1. Further, although illustrated as discrete components, various components may be divided into additional components, combined into fewer components, or eliminated altogether while being contemplated within the scope of the disclosed subject matter.

FIG. 2 provides an overview of framework 115, as part of the non-limiting example shown in and described with reference to FIG. 1. Accordingly, given a Gaussian latent code z, a tri-plane representation of a 3D feature space of a canonical head is generated by EG3D generator 135, disentangled of shape and expression controls. Having been pre-trained by parameterized FLAME mesh collections, MLP-network 125 maps a shape α, expression β, and jaw and/or neck poses θ into 3D point-to-point volumetric correspondences from observation to canonical space, together with the SDF of the corresponding FLAME head. The volume rendering may then be guided by the volumetric correspondence field to map the decoded neural radiance field from the canonical to observation space. Decoder 145 may be pre-trained with expression β and pose θ for modeling expression-dependent dynamic details. Super-resolution module 155 may synthesize the final high-resolution image from the volume-rendered feature map. For fine-grained shape and expression control, the FLAME SDF may be applied as geometric prior to encoder 165 to self-supervise the image synthesis to commit to the target expression β and joint pose θ by comparing the input code against the estimated values ^β,^θ from synthesized images at encoder 165.

More particularly, with regard to MLP 125, for the inner layer, the FLAME model may be used for control of shape, expression, jaw and neck poses as S(p={α, β, θ})); where α, β are the linear shape and expression blendshape coefficients, and θ controls the rotation of a 3-Dof jaw and neck joint. The FLAME geometry is represented as SDF for compatibility with implicit NeRF representation in the external layer. That is, given a spatial point x in observation space O(p), signed distance s(x|p) to the closest surface point of S(p) is computed. Additionally, the point is associated its canonical 3D correspondence x with which it is projected and the features from triplanes M(z) are queries. Thus, volumetric signed distance correspondence field may be defined as W(x|p)=(s, x), where the signed distance is preserved across pairs of correspondence points in canonical and observation space as s(x|p)=s(x|p).

To fully exploit the geometric knowledge in the 3D head model, W(x|p) with a large corpus of 3D FLAME meshes S(p) sampled from its parametric control space is learned. The implicit field is modeled as an MLP and W(x|p) is optimized with losses:

$$L_{tso} = \frac{1}{|N|} \sum_{x \in N} (|s(x|p)| + |\nabla_{s_x}(x|p) - n(x|p)|), \quad (1)$$

$$L_{etk} = \frac{1}{|F|} \sum_{x \in F} \|\nabla_{s_x}(x|p) - 1\|_2, \quad (2)$$

$$L_{sem} = \frac{1}{|N|} \sum_{x \in N} (|\overline{x}(x|p) - \overline{x}^*(x|\overline{p})|) \quad (3)$$

for which N, F are a batch of on and off surface samples. The $L_{tso}$ encourages the signed distance values to be on the zero-level-set and the SDF gradient to be equal to the given surface normals n. Eikonal loss $L_{elk}$ is derived from where the SDF is differentiable everywhere with gradient norm 1. Semantic loss $L_{sem}$ supervises the mapping of surface sample x∈F to x, where x* and x share the same barycentric coordinates.

To guide the canonical correspondence learning for off the-surface points, the signed distance difference between s(x|p) and s(x|p) is minimized. However, volume correspondence between the observation and canonical space may be ill-regularized, considering infinite number of points exist with the same signed distance value. Therefore volumetric correspondence field is re-formulated as W(x|p)=(s(x p), x), where the correspondence point x of x is regressed and the signed distance is obtained by querying x to a precomputed canonical SDF. Thus, even for off-the-surface samples, their canonical correspondences are well regularized in space with the properties of signed distance functions via $L_{iso}$ and $L_{elk}$. The pretrained inner SDF layer W(x|p) models the shape and expression variation.

Then, to generate a neural radiance feature (σ, f) for a point x in observation space O(p), the correspondence function W may be used to back warp x into x, with which the canonical triplane features are projected and sampled, followed with a tiny MLP decoding. However, in spite of the control disentanglement, there is no explicit loss that constrains the tri-plane-generated neural radiance density to conform to the shape and expression defined by p. Therefore, generation of neural radiance density field may be guided by minimizing its difference to the underlying FLAME head geometry represented with SDF, as:

$$L_{prior} = \frac{1}{|\mathcal{R}|} \sum_{x \in R} e^{-\gamma|s(x|p)|} |\sigma(x|z, p) - \sigma^*(x|p)|, \quad (4)$$

$$\sigma^*(x|p) = \frac{1}{x} \cdot \text{Sigmoid}\left(\frac{-s(x|p)}{x}\right) \quad (5)$$

R is the stratified ray samples for volume rendering and K is a learnable scalar controlling the density tightness around the SDF boundary. SDF value s(x|p) is converted to proxy 3D density σ* (x|p) assuming non-hollow surfaces. The weights for the geometric prior loss $L_{prior}$ are decayed as the point moving away from the SDF boundary, allowing higher degrees of freedom in generation of residual geometries, such as hair, wrinkles, and apparel. In the head region lacking visual supervisions, such as the back head, SDF prior also serves as a reasonable geometric proxy that completes the shape of the whole head.

Geometric prior loss $L_{prior}$ provides local 3D pointwise guidance, and is able to regularize the shape generation and achieve coarse-level expression control. However, for delicate expressions, such as eye blinks, $L_{prior}$ provides little supervision as the geometric variation is subtle. Moreover, for regions with complex correspondences, such as around the lips, it is challenging to guide the formation of correct expressions globally, just with point-wise geometric losses. To improve the control granularity, we propose an image-level supervision loss that requires a synthesized image IRGB(z|c, p) matching the target expression as defined in p. With our training images with estimated control labels p, we first pretrain an image encoder E(IRGB)=(~B, ~θ) that regresses the expression coefficients ~B and joint poses ~θ. During our 3D GAN training, we then apply our image-level control supervision as $$L_{enc} = |\tilde{\beta} - \beta| + |\tilde{\theta} - \theta| + |S(\alpha, \tilde{\beta}, \tilde{\theta}) - S(\alpha, \beta, \theta)| + +|JS(\alpha, \tilde{\beta}, \tilde{\theta}) - JS(\alpha, \beta, \theta)|, \quad (6)$$

S, J are the FLAME mesh vertices and 3D landmarks regressor respectively. While being straightforward for the first 2 terms, the last two terms in Lenc penalize deviation of 3D vertex coordinates and surface landmarks after mesh decoding. We note that we do not supervise shape α in $L_{enc}$ since our geometric prior loss $L_{prior}$ suffices in shape control already and also due to the ambiguity of shape scaling estimated from monocular images.

Thus, the embodiments of FIGS. 1 and 2 achieve controllable static image synthesis. However, the variation of shading and geometric details in a dynamic head motion, such as the appearance of dimples and eye wrinkles in smiling, should be noted. The appearance of dynamic details correlates with the driving expression (β, θ). To model such temporal effects, the triplane generation may be conditioned on expression M(z, β, θ). However, such design results in entanglement of expression control with the generative latent code z, inducing potential identity or appearance changes when varying expressions. To synthesize images out of training distribution of expressions (β, θ), triplane generation may be disentangled but when decoding neural feature field (σ, f) from sampled triplane features, the MLP may also be conditioned on β and θ. Specifically:

$$(\sigma(x), f(x)|z, p) = \Phi(M(\tilde{x}(x \mid p)|z), \varphi(\beta, \theta)), \quad (7)$$

where both φ and φ are tiny MLPs and φ regresses an expression-dependent feature vector from (β, θ) after positional encoding. For better extrapolation to novel expressions and jaw poses, we add Gaussian noise to the conditioning parameters to prevent MLP overfitting.

Figure 3:
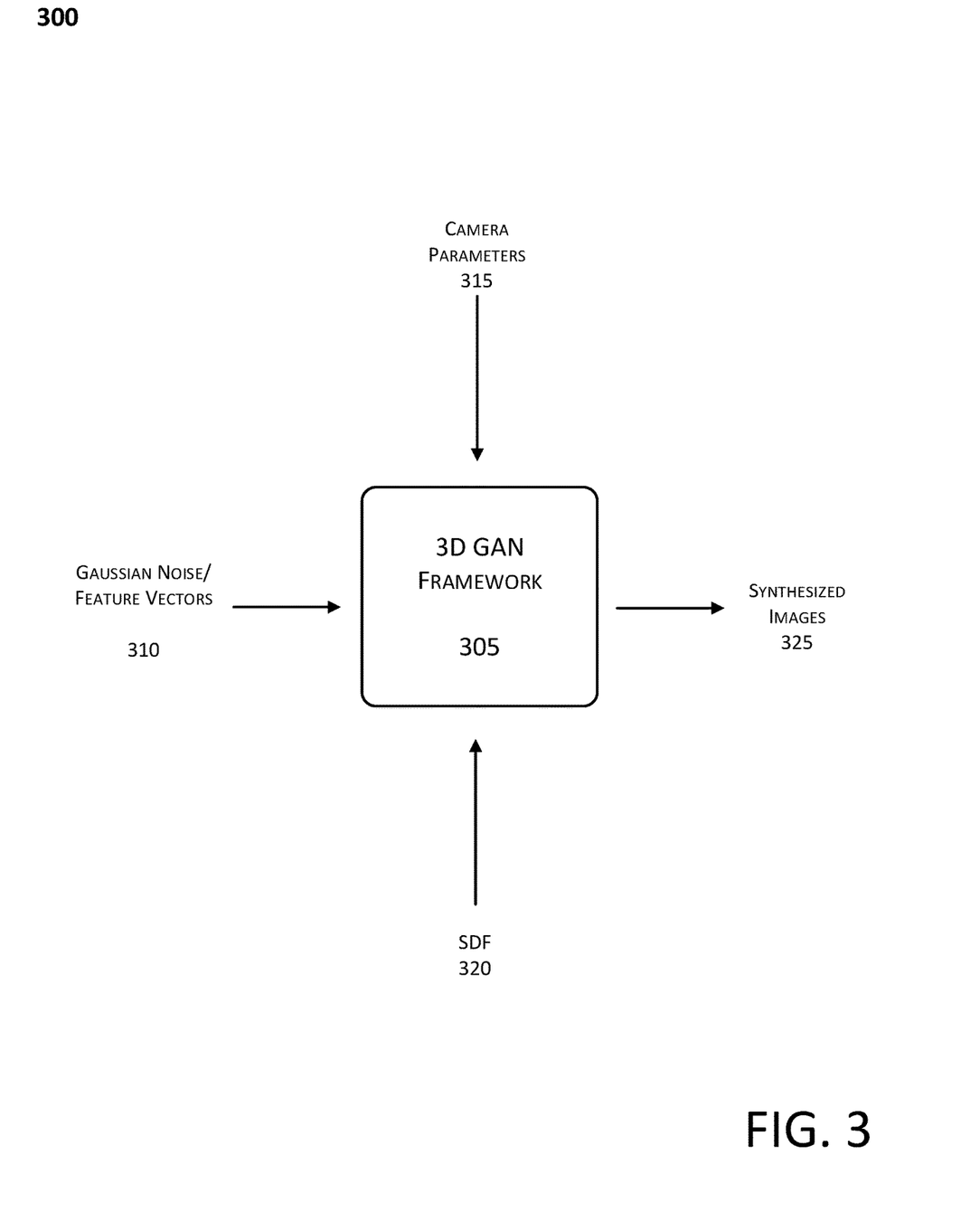
FIG. 3 shows an example processing flow for implementation geometry-guided 3D head synthesis, in accordance with at least some embodiments described and recited herein.

FIG. 3 shows a 3D-aware image synthesis network by which the appearance of the subject may be changed, i.e., controlled; the poses of the subject, i.e., camera angles, may be controlled; and the shape of the subject may also be controlled, in relation to the embodiments of FIGS. 1 and 2.

3D GAN framework/model 305, corresponding to those described with reference to FIGS. 1 and 2, is to receive the parameters from blocks 310, 315, and 320; and outputs synthesized images 325.

Input 310 may include Gaussian noise/features vectors, i.e., latent code z.

Input 315 may include camera poses, on the order of one-hundred parameters.

Input 320 may include SDF control parameters shape α, expression β, and jaw and/or neck poses θ.

Thus, based on user input, e.g., picture, graphic, video, etc., the FLAME model on which Framework 305 is conditioned, may be changed. Thus, 3D GAN Framework 305 generate an image with the corresponding expression, shape and camera and also appearance.

That is, method for generating controllable three-dimensional (3D) synthesized images includes: generating, by a 3D model generator, 3D representations of a head geometry in a canonical space based on feature vectors and camera viewing parameters; mapping control parameters for the head geometry, corresponding to an input, and a signed distance function (SDF) onto the head geometry to produce 3D point-to-point volumetric correspondences of points in the observation space to the head geometry in the canonical space; combining the 3D representations of the head geometry and the 3D point-to-point volumetric correspondences of points in the observation space to the head geometry in the canonical space to produce a 3D object; synthesizing the 3D object to combine feature layers of the 3D object; volume rendering the synthesized 3D object based on the 3D point-to-point volumetric correspondences to produce a volume-rendered feature map; synthesizing, by a super-resolution module, the volume-rendered feature map to produce a high-resolution image; and encoding the high-resolution image to produce a controllable 3D model having the control parameters corresponding to the input.

Overall, by the example embodiments described and recited herein, tri-plane generation is explicitly disentangled from shape and expression control. Moreover, the deformation of the neural radiance field is learned from large collections of 3D meshes with abundant 3D geometric information and largely augmented the control space. Therefore, the framework described and recited herein is less dependent on the distribution of the training images and supports improved extrapolation to unseen novel expressions.

Ultimately, provided herein are high-quality synthesized head images with extreme jaw and neck articulated movements that do not exist in the training images. The expression control provided hereby is more expressive, supporting subtle expressions like eye blinks.

Due to high control accuracy, the embodiments described and recited herein may provide, as a non-limiting example, the synthesis of various talking head videos with the same head movements and expressions performed by different identities. That is, the embodiments described and recited herein provide expressive synthesized images that depict both large articulated neck and jaw movements in addition to subtle facial expressions like eye blinks, with rich dynamic details. Shape manipulation is easily achievable as well by modifying the shape parameters.

The embodiments described and recited herein also support 3D-aware face reenactment of a single-view portrait to a video sequence. To that end, optimization may be performed in a latent Z+ space to find the corresponding latent embedding z, with FLAME parameter and camera pose estimated from the input portrait. With a frozen generator, the optimization is performed by measuring the similarity between generated image and real image using the L2 loss and LPIPS loss. For better reconstruction quality, parameters of the tri-plane synthesis module may be altered with a fixed optimized latent code. Thus, the portrait may be altered semantically with a preserved identity and in different camera pose and expression. Following the expression code ($\beta$, $\theta$) reconstructed from a video sequence, the portrait may be realistically animated.

Figure 4:
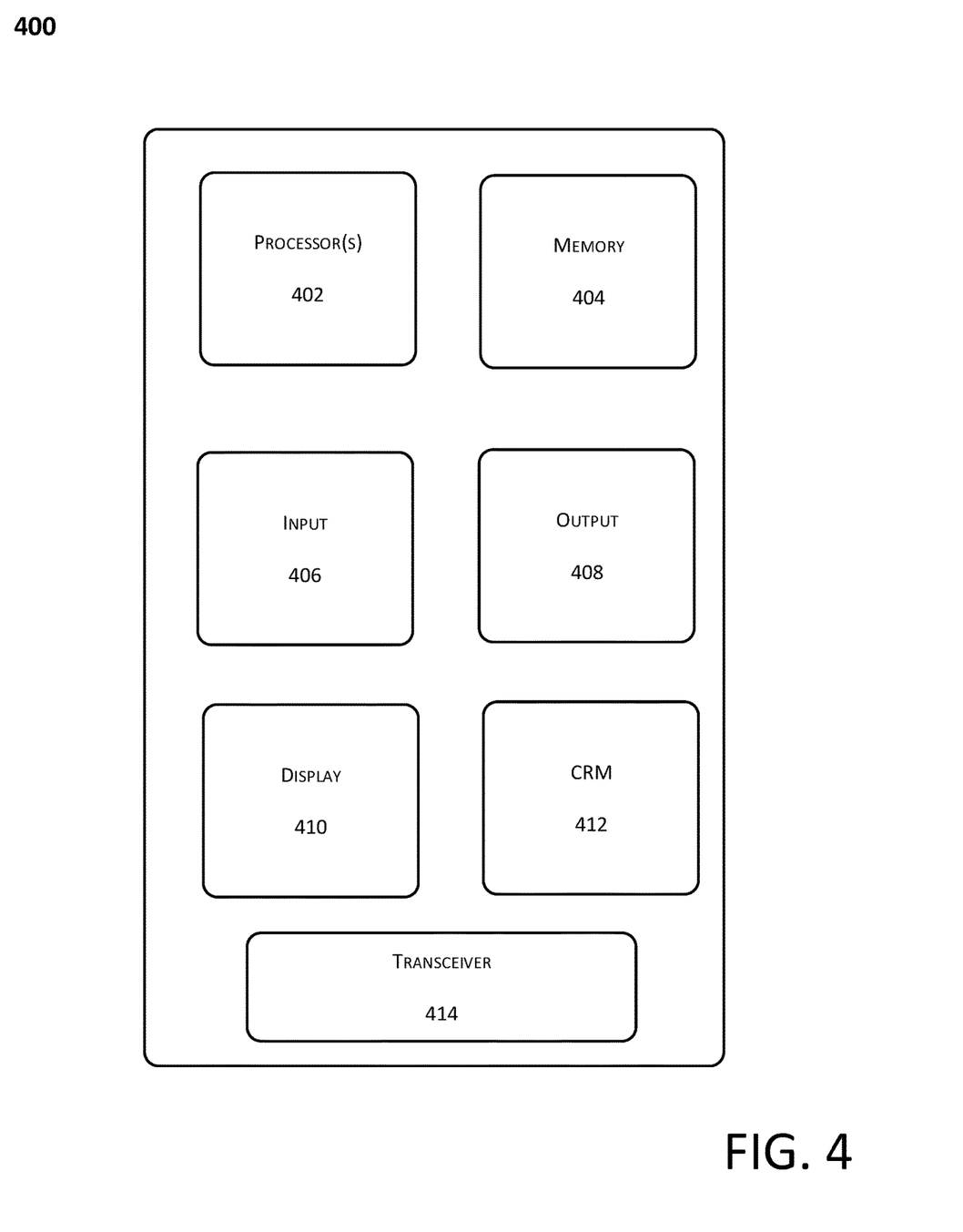
FIG. 4 shows an illustrative computing embodiment, in which any of the processes and sub-processes for geometry-guided 3D head synthesis may be implemented as executable instructions stored on a non-volatile computer-readable medium.

FIG. 4 shows an illustrative computing embodiment, in which any of the processes and sub-processes of geometry-guided 3D head synthesis may be implemented as executable instructions stored on a non-volatile computer-readable medium. The computer-readable instructions may, for example, be executed by a processor of a device, as referenced herein, having a network element and/or any other device corresponding thereto, particularly as applicable to the applications and/or programs described above corresponding to system 200 to implement geometry-guided 3D head synthesis.

In a very basic configuration, a computing device 400 may typically include, at least, one or more processors 402, a memory 404, one or more input components 406, one or more output components 408, a display component 410, a computer-readable medium 412, and a transceiver 414.

Processor 402 may refer to, e.g., a microprocessor, a microcontroller, a digital signal processor, or any combination thereof.

Memory 404 may refer to, e.g., a volatile memory, non-volatile memory, or any combination thereof. Memory 404 may store, therein, an operating system, one or more applications corresponding to media platform 110 and/or program data therefore. That is, memory 404 may store executable instructions to implement any of the functions or operations described above and, therefore, memory 404 may be regarded as a computer-readable medium.

Input component 406 may refer to a built-in or communicatively coupled keyboard, touch screen, telecommunication device, i.e., smartphone, and/or a microphone that is configured, in cooperation with a voice-recognition program that may be stored in memory 404, to receive voice commands from a user of computing device 400. Further, input component 406, if not built-in to computing device 400, may be communicatively coupled thereto via short-range communication protocols including, but not limitation, radio frequency or Bluetooth®.

Output component 408 may refer to a component or module, built-in or removable from computing device 400, that is configured to output commands and data to an external device.

Display component 410 may refer to, e.g., a solid state display that may have touch input capabilities. That is, display component 410 may include capabilities that may be shared with or replace those of input component 406.

Computer-readable medium 412 may refer to a separable machine-readable medium that is configured to store one or more programs that embody any of the functions or operations described above. That is, computer-readable medium 412, which may be received into or otherwise connected to a drive component of computing device 400, may store executable instructions to implement any of the functions or operations described above. These instructions may be complimentary or otherwise independent of those stored by memory 404.

Transceiver 414 may refer to a network communication link for computing device 400, configured as a wired network or direct-wired connection. Alternatively, transceiver 414 may be configured as a wireless connection, e.g., radio frequency (RF), infrared, Bluetooth®, and other wireless protocols.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

Aspects

Aspect 1. A method for generating controllable three-dimensional (3D) synthesized images, comprising:
conditioning, by a 3D model generator, 3D representations of a head geometry in a canonical space based on feature vectors and camera viewing parameters by:
mapping control parameters for the head geometry, corresponding to an input, and a signed distance function (SDF) onto the head geometry to produce 3D point-to-point volumetric correspondences of points in the observation space to the head geometry in the canonical space;
combining the 3D representations of the head geometry and the 3D point-to-point volumetric correspondences of points in the observation space to the head geometry in the canonical space to produce a 3D object; and
synthesizing the 3D object to combine feature layers of the 3D object.

Aspect 2. The method of Aspect 1, further comprising:
volume rendering the synthesized 3D object based on the 3D point-to-point volumetric correspondences to produce a volume-rendered feature map;
synthesizing, by a super-resolution module, the volume-rendered feature map to produce a high-resolution image; and
encoding the high-resolution image to produce a controllable 3D model having the control parameters corresponding to the input.

Aspect 3. The method of either Aspect 1 or Aspect 2, further comprising determining, by a discriminator, whether the high-resolution image is authentic.

Aspect 4. The method of any of Aspects 1-3, wherein the mapping is executed by a trained MLP.

Aspect 5. The method of any of Aspects 1-4, wherein control parameters correspond to a FLAME (faces learned with an articulated model and expressions) model.

Aspect 6. The method of Aspect 1-5, wherein the control parameters include parameters for facial shape, facial expressions, and jaw and neck poses.

Aspect 7. The method of any of Aspects 1-6, further comprising optimizing a geometry prior loss to reduce a difference between a synthesized neural density field and the SDF.

Aspect 8. The method of any of Aspects 1-7, further comprising optimizing a control loss to control matching of synthesized images and the input control code upon encoding.

Aspect 9. The method of any of Aspects 1-8, wherein the 3D object is produced as a layered combination of an inner feature layer and an external feature layer, the inner feature layer corresponding to the 3D point-to-point volumetric correspondences of points in the observation space, and the external feature layer corresponding to the 3D representations of the head geometry.

Aspect 10. The method of Aspects 1-9, wherein the SDF is trained on 3D geometric information from a FLAME (faces learned with an articulated model and expressions)

model to produce a volumetric correspondence map from the observation space to the canonical space.

Aspect 11. The method of any of Aspects 1-10, wherein the volume rendering, synthesizing by the super-resolution module, and the encoding are executed by a 3D GAN framework.

Aspect 12. An image synthesis framework to produce controllable three-dimensional (3D) synthesized images, comprising:
    conditioning a 3D model generator to generate 3D representations of a head geometry in a canonical space based on feature vectors and camera viewing parameters;
    a multilayer perceptron (MLP) to map control parameters for the head geometry, corresponding to an input, and a signed distance function (SDF) onto the head geometry to produce 3D point-to-point volumetric correspondences of points in the observation space to the head geometry in the canonical space;
    a synthesizer to combine the 3D representations of the head geometry and the 3D point-to-point volumetric correspondences of points in the observation space to the head geometry in the canonical space to produce a 3D object;
    another synthesizer to synthesize the 3D object to combine feature layers of the 3D object;
    a renderer to volume render the synthesized 3D object based on the 3D point-to-point volumetric correspondences to produce a volume-rendered feature map;
    a super resolution module to synthesize the volume-rendered feature map to produce a high-resolution image; and
    an encoder to encode the high-resolution image to produce a controllable 3D model having the control parameters corresponding to the input.

Aspect 13. The image synthesis framework of Aspect 12, further comprising a discriminator to determine whether the high-resolution image is authentic.

Aspect 14. The image synthesis framework of either Aspect 12 or Aspect 13, further comprising an encoder to reduce a different between a synthesized neural density field and the SDF.

Aspect 15. The image synthesis framework of any of Aspects 12-14, further comprising an encoder to control matching of synthesized images and the input control code.

What is claimed:

1. A method for generating controllable three-dimensional (3D) synthesized images, comprising:
    conditioning, by a 3D model generator, 3D representations of a head geometry in a canonical space based on feature vectors and camera viewing parameters by:
    mapping control parameters for the head geometry, corresponding to an input, and a signed distance function (SDF) onto the head geometry to produce 3D point-to-point volumetric correspondences of points in an observation space to the head geometry in the canonical space;
    combining the 3D representations of the head geometry and the 3D point-to-point volumetric correspondences of points in the observation space to the head geometry in the canonical space to produce a 3D object; and
    synthesizing the 3D object to combine feature layers of the 3D object, wherein the 3D object is produced as a layered combination of an inner feature layer and an external feature layer, the inner feature layer corresponding to the 3D point-to-point volumetric correspondences of points in the observation space, and the external feature layer corresponding to the 3D representations of the head geometry.

2. The method of claim 1, further comprising:
    volume rendering the synthesized 3D object based on the 3D point-to-point volumetric correspondences to produce a volume-rendered feature map;
    synthesizing, by a super-resolution module, the volume-rendered feature map to produce a high-resolution image; and
    encoding the high-resolution image to produce a controllable 3D model having the control parameters corresponding to the input.

3. The method of claim 2, wherein the volume rendering, synthesizing by the super-resolution module, and the encoding are executed by a 3D GAN framework.

4. The method of claim 1, further comprising determining, by a discriminator, whether the high-resolution image is authentic.

5. The method of claim 1, wherein the mapping is executed by a trained multilayer perceptron (MLP).

6. The method of claim 5, wherein the MLP is trained on 3D geometric information from a FLAME (faces learned with an articulated model and expressions) model to produce a volumetric correspondence map from the observation space to the canonical space.

7. The method of claim 1, wherein the control parameters correspond to a FLAME (faces learned with an articulated model and expressions) model.

8. The method of claim 1, wherein the control parameters include parameters for facial shape, facial expressions, and jaw and neck poses.

9. The method of claim 1, further comprising optimizing a geometry prior loss to reduce a difference between a synthesized neural density field and a density field of the SDF.

10. The method of claim 1, further comprising optimizing a control loss to control matching of synthesized images and an input control code upon encoding.

11. An image synthesis framework to produce controllable three-dimensional (3D) synthesized images, comprising:
    a 3D model generator to generate 3D representations of a head geometry in a canonical space based on feature vectors and camera viewing parameters;
    a multilayer perceptron (MLP) to map control parameters for the head geometry, corresponding to an input, and a signed distance function (SDF) onto the head geometry to produce 3D point-to-point volumetric correspondences of points in an observation space to the head geometry in the canonical space;
    a first synthesizer to combine the 3D representations of the head geometry and the 3D point-to-point volumetric correspondences of points in the observation space to the head geometry in the canonical space to produce a 3D object;
    a second synthesizer to synthesize the 3D object to combine feature layers of the 3D object, wherein the 3D object is produced as a layered combination of an inner feature layer and an external feature layer, the inner feature layer corresponding to the 3D point-to-point volumetric correspondences of points in the observation space, and the external feature layer corresponding to the 3D representations of the head geometry;
    a renderer to volume render the synthesized 3D object based on the 3D point-to-point volumetric correspondences to produce a volume-rendered feature map;

a super resolution module to synthesize the volume-rendered feature map to produce a high-resolution image; and an encoder to encode the high-resolution image to produce a controllable 3D model having the control parameters corresponding to the input.

12. The image synthesis framework of claim 11, further comprising a discriminator to determine whether the high-resolution image is authentic.

13. The image synthesis framework of claim 11, further comprising an encoder to reduce a difference between a synthesized neural density field and a density field of the SDF.

14. The image synthesis framework of claim 11, further comprising an encoder to control matching of synthesized images and an input control code.

* * * * *